United States Patent [19]
Nakagawa et al.

[11] 3,757,700
[45] Sept. 11, 1973

[54] RAIL VEHICLE WITH ELECTROMAGNET ENGAGING BELT DRIVE

[75] Inventors: Kanenari Nakagawa; Hidero Yuki, both of Tokyo, Japan

[73] Assignee: Automa Engineering Co., Ltd., Tokyo, Japan

[22] Filed: May 1, 1972

[21] Appl. No.: 249,184

[52] U.S. Cl. ............................. 104/165, 104/148 R
[51] Int. Cl. .......................................... B61b 13/12
[58] Field of Search .................. 104/165, 170, 172, 104/147, 148 R, 202, 1 R; 46/240; 198/41

[56] References Cited
UNITED STATES PATENTS
3,083,650   4/1963   Peras ............................. 104/172 S
3,675,583   7/1972   Sobey et al. .................... 104/147 R FOREIGN PATENTS OR APPLICATIONS
1,185,929   3/1970   Great Britain ............... 104/148 LM Primary Examiner—Gerald M. Forlenza
Assistant Examiner—George H. Libman
Attorney—E. F. Wenderoth et al.

[57] ABSTRACT

A vehicle operated by electromagnetically connecting the vehicle to a moving magnetic means. The vehicle has a plurality of wheels running on rails and has electromagnetic means thereon. Running in the same direction as the rails is a magnetic means, such as a magnetic belt or chain, and the electromagnetic means on the vehicle is energized to electromagnetically connect the vehicle with the moving magnetic means.

7 Claims, 5 Drawing Figures

Patented Sept. 11, 1973

Patented Sept. 11, 1973

RAIL VEHICLE WITH ELECTROMAGNET ENGAGING BELT DRIVE

This invention relates to trucks driven by action of a moving magnetic material. The trucks ride on L-shaped rails which act as a guide. An electromagnet on the central portion of the truck magnetically engages the moving magnetic material when energized through feeder lines running along the rails. The invention seeks to provide means to facilitate assembly line operations, improvements in production control, and layout of inexpensive labor saving article moving means.

One embodiment of the present invention will now be more fully described with reference to the drawings.

Figure 1:
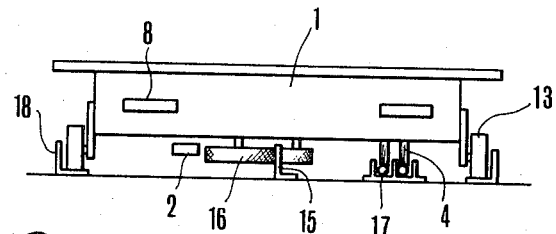
FIG. 1 is a front view of the apparatus according to the invention.

On a front truck 1 there is provided spring mounted electromagnet 3 which, when energized, engages a moving magnetic material 2, which will be described in greater detail hereinafter. The truck 1 runs on wheels 13, which in turn run on side rails 18. The electromagnet 3 is connected between current collectors 4 which are in electrical contact with feeder lines 17, which in turn extend along the path of the rails 18 and the magnetic material 2. An armature 5 pivoted on truck 1 presses firmly against a brake drum 7 under the action of a spring 6. The drum 7 is on the axle of a roller 16 engaged with a guide rail 15 which also runs along the path of the side rails 18 and magnetic material 2. The engagement of the roller 16 with the guide rail 15 is such that when the roller 16 is stopped, the truck is braked by the engagement of roller 16 with the guide rail 15, and the truck 1 will not be moved by any external force. On the front of the truck 1 there is mounted a contact 8 which is connected in the circuit with the electromagnet 3, current collectors 4 and feeder lines 17, and the contact is actuated to the open position by pressure thereon to deenergize the electromagnet 3 when the truck collides with some object, so as to release the truck 1 from engagement with the moving magnetic material, thus stopping the truck. Since the truck when it is stopped is entirely separated from the moving magnetic material, no load is imposed thereby on driving means of the moving magnetic material.

For the purpose of changing into a different system such as lifter and the like, a rear truck 1' can be provided which has an auxiliary electromagnet 3' and an auxliliary current collector 4' thereon, a control panel 9 encasing a fuse and a switch and serving as a protective device and located at the rear thereof, and further has a control board 10 provided with printed wiring for making mass production easier, and a direction memory device on the side thereof. The front and rear trucks are connected by means of a signal-cable-containing pipe 12, and the rear truck 1' is supported by rotatable side wheels 14.

The moving magnetic material 2 is mounted in the central portion between rails 18 and its form depends on the driving conditions under which the truck must be moved.

For a relatively low speed and heavy load, the means 2 can be steel plate made roller chain.

In case of a relatively high speed and heavy load, the means 2 can be a steel belt.

In case of a relatively high speed and light load, th means 2 can be a V-belt containing iron powder.

In case of a high speed and light load, the means 2 can be fluid containing magnetic powder, such as air or oil and the like or a linear magnetic induction motor.

The basic operation will now be explained.

Figure 3:
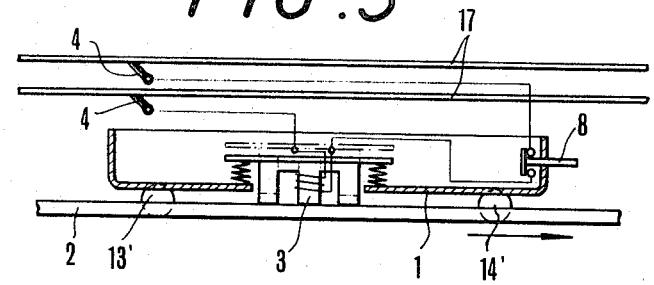
FIG. 3 is a schematic side view showing the apparatus in operation.

As shown in FIG. 3, the moving magnetic material 2 moves at a given speed in the direction shown by an arrow. When a current is supplied to the feeders 12, the electromagnet 3 is excited through the current collectors 4 and the contact 8 so as to form a magnetic circuit relative to the moving magnetic material 2. The springs are compressed and the magnet 3 engages the moving magnetic material 2, thus causing the truck to commence moving at a synchronous speed with that of the moving magnetic material 2 in the direction shown by the arrow.

By said means, the drawing force on the truck can be controlled, irrespective of speed of the moving magnetic material 2, by controlling the exciting current of the electromagnet 3 so that starting and stopping can be freely controlled by supplying or discontinuing a current from the feeder 17 and by switching the contact 8. With these features an extremely complicated layout can be planned by various combinations of the foregoing three features.

Figure 4:
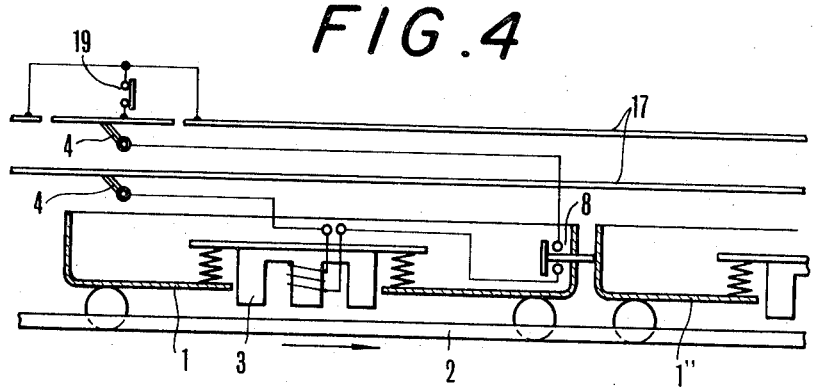
FIGS. 4 and 5 are views similar to FIG. 3 showing various modifications.

The embodiment shown in FIG. 4 is modified to automatically start a waiting truck by means of a signal. One of the feed lines 17 is interrupted to provide an isolated segment, and the isolated segment is bridged by a conductor. A switch 19 is connected between the bridging circuit and the isolated segment. With a truck in position with one of the current collectors 4 in contact with the isolated segment, the truck can be started by closing the switch 19.

FIG. 4 also shows the situation when a following truck 1 collides with a leading truck 1" to actuate the contact 8 to break the circuit with the electromagnet 3 therein. The following truck 1 will remain stopped until the leading truck 1" moves out of the way, at which time the contact 8 closes, and the circuit to the electromagnet 3 is completed. If the contact 19 is closed, the truck 1 will start.

Figure 2:
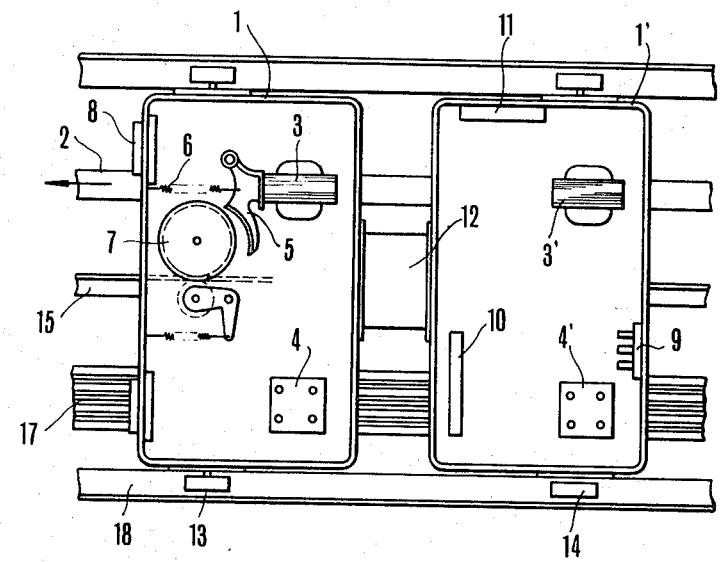
FIG. 2 is a plan view thereof.
Figure 5:
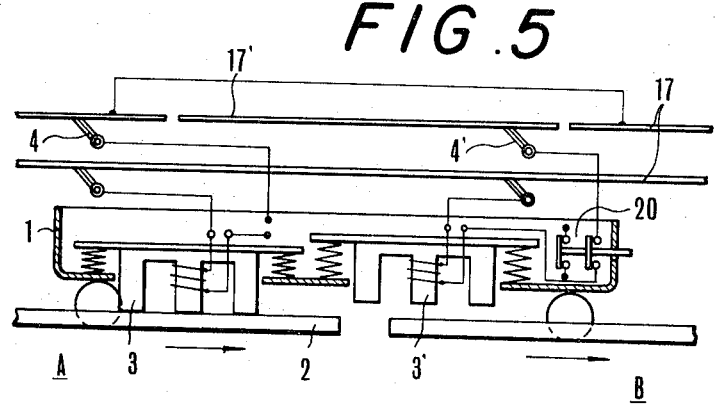

In the embodiment of FIG. 5, the truck has two electromagnets thereon, in a manner similar to the front and rear trucks shown in FIG. 2. Instead of the specific truck shown in FIG. 5, the trucks 1 and 1' of FIG. 2 can also be used. The magnetic means 2 is in two portions, A and B, which would be the case where there was a necessity to switch a truck to a branch line or from one system to another. One feeder line 17 is interrupted at the junction, and a non-energized segment 17' is provided briging the junction. A bridging circuit is conncted between the two energized segments of the interrupted feed line 17 to bridge the interruption. The length of the interruption is the same as the distance between the collectors 4 for the electromagnets 3 and 3'.

In operation, when the current collectors 4' for the front electromagnet 3' reach the isolated segment 17', the front electromagnet will be deenergized, and it can cross the gap between the portions A and B of magnetic means 2. At the time the front current collectors reach the energized portion of the feeder line 17 and the front electromagnet 3' is energized, the rear current collectors 4 will have reached the isolated segment 17' and the rear electromagnet 3 will be deenergized. The truck will thus have been transferred from the portion A to the portion B of the magnetic means 2.

The same-embodiment can be used to change the truck from a portion A of the magnetic moving means moving at one speed to a portion B of the magnetic moving means moving at another speed.

The switch 20 is similar to switch 8, but it is a double contact switch with a contact for the circuit of each electromagnet 3.

As a source of power for the present invention, an external feeding system which feeds from the outside is employed, but power can be supplied by housing batteries and the like in the running truck.

As is clear from the foregoing description, the present invention provides means to carry out an assembly line operation together with various functions, improvements in production control and a great saving of labor.

We claim as our invention:

1. An electromagnetic vehicle moving system comprising parallel side rails extending along a path, a guide rail extending parallel with the side rails, at least one electric feeder line extending parallel with the side rails, a moving magnetic material extending along the path parallel with said rails, at least one truck having wheels thereon running on said side rails, at least one electromagnet movably mounted on said truck in alignment with said moving magnetic material, at least one current collector engaged with the feeder line, and electrically connected with said electromagnet, magnetically opened brake means on said truck magnetically associate with said electromagnet and normally spring loaded into braking engagement with said guide rail for braking said truck when said electromagnet is deenergized and being opened when said magnet is energized.

2. An electromagnetic vehicle moving system as claimed in claim 1 in which there are at least two feeder lines and at least two current collectors, one in engagement with each line, said current collectors being connected in a circuit with said electromagnet.

3. An electromagnetic vehicle moving system as claimed in claim 1 further comprising a make and break switch in series with said current collector and said electromagnet, and having an extension projecting forwardly of said truck, whereby the electromagnet is deenergized by a break in the circuit thereto when the truck engages a truck ahead of it on said rails.

4. An electromagnetic vehicle moving system as claimed in claim 1 in which there is at least two electromagnets and two pairs of current collectors, and at least two feeder lines.

5. An electromagnetic vehicle moving system as claimed in claim 1 in which said brake means comprises a brake wheel frictionally engagable with said guide wheel, a brake drum coupled to said brake wheel, a brake shoe movable into and out of engagement with said drum, spring means connected to said brake shoe urging the brake shoe into engagement with said drum, and an armature on said brake shoe in magnetic relationship to said electromagnet and being attracted to said electromagnet and moving said brake shoe out of engagement with said drum against the action of said spring means when said electromagnet is energized.

6. An electromagnetic vehicle moving system as claimed in claim 1 in which there are two feeder lines and two current collectors, one of said feeder lines being interrupted and having an isolated segment unconnected with the remainder of the feeder line, and a switch connected between the isolated segment and the bridging conductor, whereby when the truck is positioned with the current collector on the isolated segment and the switch is off, the truck is stopped, and by turning the switch on, the electromagnet is energized to start the truck moving with the moving magnetic material.

7. An electromagnetic vehicle moving system as claimed in claim 1 in which there is at least one feeder line and two electromagnets spaced along the truck in the direction of movement along the rails and each having a current collector connected thereto, the moving magnetic material being interrupted, the feeder line having an isolated segment bridging the interruption in the moving magnetic material, a conductor bridging the isolated feeder line segment, and the current collectors for the respective electromagnets which electrically contact the interrupted feeder line being spaced apart on said truck a distance substantially equal to the length of the interruption in the feeder line, whereby when the current collector for the leading electromagnet reaches the interruption in the feeder line, the leading electromagnet will be deenergized and will be able to move from a position in alignment with the one portion of the moving magnetic material to a position in alignment with the other portion of the moving magnetic material, and when the current collector for the trailing electromagnet reaches the interruption in the feeder line and the trailing electromagnet is deenergized, the current collector for the leading electromagnet will have passed the interruption and reached the energized portion of the feeder line to reenergize the leading electromagnet.

* * * * *